United States Patent
Kum et al.

(10) Patent No.: US 10,516,719 B1
(45) Date of Patent: Dec. 24, 2019

(54) WEARABLE DEVICE REGISTRATION SYSTEM AND METHOD

(71) Applicant: Korea Electronics Technology Institute, Seongnam-si, Gyeonggi-do (KR)

(72) Inventors: Seung Woo Kum, Yongin-si (KR); Jae Won Moon, Seoul (KR)

(73) Assignee: Korea Electronics Technology Institute, Seongnam-si, Gyeonggi-do (KR)

( * ) Notice: Subject to any disclaimer, the term of this patent is extended or adjusted under 35 U.S.C. 154(b) by 0 days.

(21) Appl. No.: 16/119,463

(22) Filed: Aug. 31, 2018

(51) Int. Cl.
*H04W 60/04* (2009.01)
*H04L 29/08* (2006.01)
*H04W 8/00* (2009.01)

(52) U.S. Cl.
CPC .............. *H04L 67/02* (2013.01); *H04L 67/04* (2013.01); *H04W 8/005* (2013.01); *H04W 60/04* (2013.01)

(58) Field of Classification Search
CPC ................................. H04L 67/02; H04L 67/04
See application file for complete search history.

(56) References Cited

U.S. PATENT DOCUMENTS

| 7,031,945 B1* | 4/2006 | Donner ................. G06Q 10/02 705/64 |
| 2010/0235525 A1* | 9/2010 | McGuire ............ H04L 61/1511 709/228 |
| 2016/0173617 A1* | 6/2016 | Allinson ................ H04L 67/02 709/227 |

* cited by examiner

Primary Examiner — Tuan H Nguyen
(74) Attorney, Agent, or Firm — Knobbe Martens Olson & Bear LLP

(57) ABSTRACT

Disclosed is a system and method for searching and registering a wearable Bluetooth device in a surrounding area. The searching Bluetooth device broadcasts a session description protocol (SDP) request message by executing the SDP. When the SDP request message broadcast by the searching Bluetooth device is received, a surrounding Bluetooth device executes the SDP, generates an SDP response message, and transmits the SDP response message to the searching Bluetooth device. When the SDP response message is received, the searching Bluetooth device requests that the server provide the detailed information file of the surrounding Bluetooth device, based on server access information included in the SDP response message. When the detailed information file of the surrounding Bluetooth device is received from the server, the searching Bluetooth device stores the detailed information file.

8 Claims, 2 Drawing Sheets

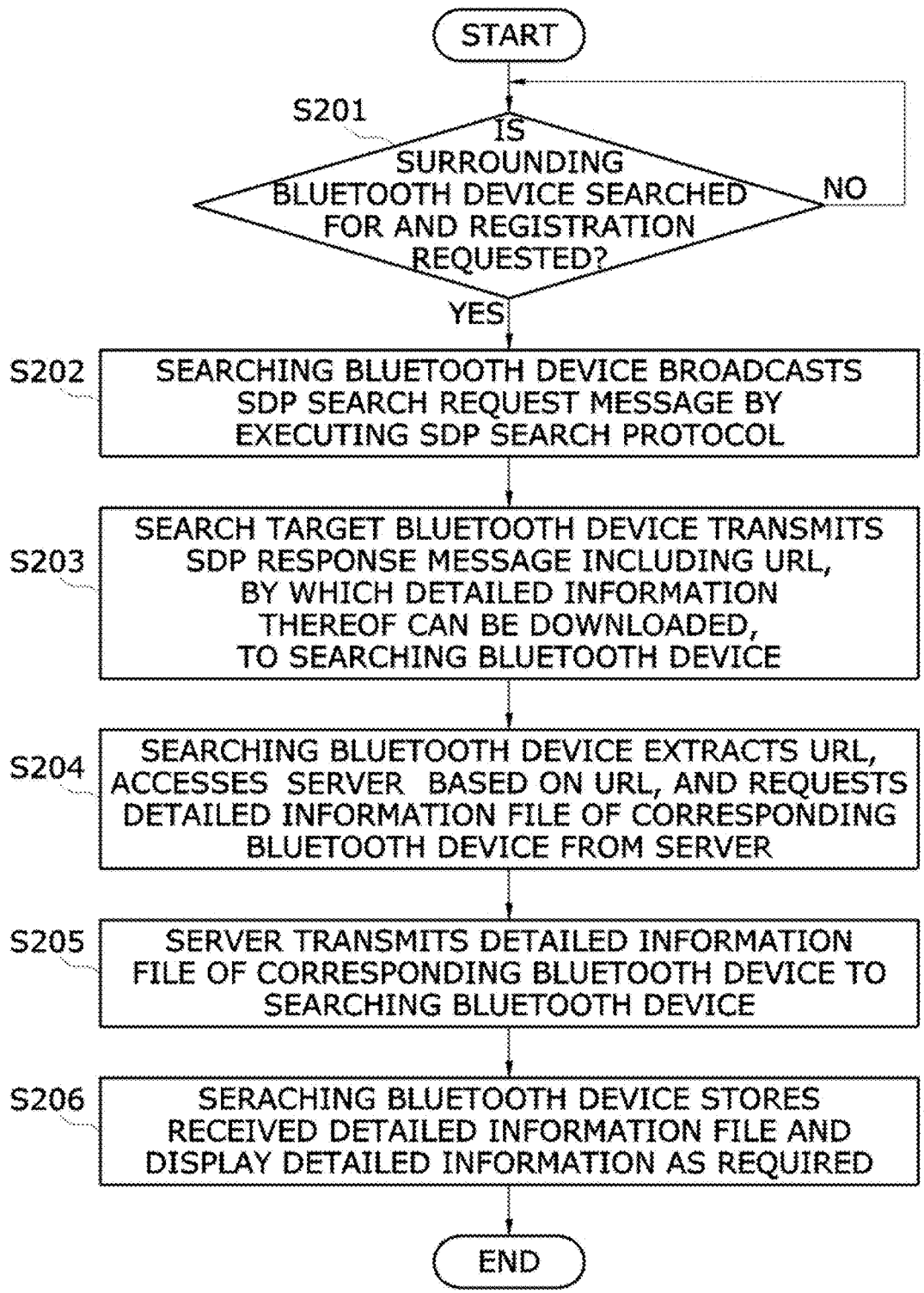

WEARABLE DEVICE REGISTRATION SYSTEM AND METHOD

BACKGROUND

Field

The present disclosure relates, in general, to a wearable device registration system and method, and more particularly, to a wearable device registration system and method for searching for wearable devices having a Bluetooth communication function in a surrounding area, and being provided with detailed information regarding the searched wearable devices by a separate server.

Related Art

Bluetooth technology enables communication devices to perform wireless communications without the use of wires. Bluetooth technology uses an industrial, scientific, and medical (ISM) wireless band of 2.4 GHz, which does not require permissions.

A Bluetooth system supports one-to-one or one-to-many connections between Bluetooth devices having a Bluetooth function.

Bluetooth technology is used to connect a printer, a keyboard, a mouse, and the like to a personal computer (PC), such as a laptop computer or a desktop computer, without the use of cables.

In addition, Bluetooth technology is used for data exchanges between a variety of mobile devices, such as a personal digital assistant (PDA), a mobile phone, a smartphone, a tablet computer, or a laptop computer, and between a mobile device and wearable devices (e.g., a smartwatch, a smartband, or a smartglass).

Furthermore, Bluetooth technology is used for wirelessly connecting a headset, an earphone, a speaker, or the like, to a mobile terminal.

Pairing must be established for communication between Bluetooth devices. For pairing between a pair of Bluetooth devices, an inquiry process, in which one Bluetooth device searches for another Bluetooth device in a surrounding area, is undertaken.

In the inquiry process, a searching Bluetooth device, i.e., a Bluetooth device searching for another Bluetooth device in the surrounding area, acts as a master device, while a target Bluetooth device, i.e., a Bluetooth device responding to the searching of the master device, acts as a slave device.

The master device transmits an inquiry message for searching for Bluetooth devices in the surrounding area.

When the inquiry message is received from the master device, the Bluetooth devices surrounding the master device transmit inquiry response messages to the master device. The inquiry response messages include Bluetooth address information of the slave devices.

When the inquiry response messages are received from the slave devices, the master device transmits a remote name request message to the slave devices, requesting for remote names of slave devices. The remote names are names of the Bluetooth devices, for example, model names of the Bluetooth devices.

When the remote name request message is received from the master device, the slave devices transmit remote name response messages, including the remote names thereof, to the master device.

When the master device has found one or more Bluetooth devices in the surrounding area in the above-described inquiry process, the master device displays a Bluetooth device list on a display, the Bluetooth device list representing the one or more Bluetooth devices that have been found in the surrounding area. Accordingly, the user can find a Bluetooth device that can be paired with, based on the displayed Bluetooth device list.

When the user selects a Bluetooth device that the user wants to be paired with, the master device transmits a pairing request message to the selected Bluetooth device, so that pairing can be established between the master device and the Bluetooth device selected by the user.

Since there are a variety of Bluetooth functions according to the profile, it may be difficult for users to understand every Bluetooth function. In addition, even in the case of Bluetooth devices having the same Bluetooth function, the Bluetooth devices may be used in different manners. Accordingly, it may be difficult for users to use a variety of Bluetooth devices. In particular, a dedicated application is necessary to use some devices, such as a headset, a television (TV), and a car kit, having a Bluetooth function.

For example, in the case of attempting to use a specific Bluetooth device by pairing the Bluetooth device with a mobile terminal, a user must read a manual or download a necessary application of the Bluetooth device by searching for information regarding the manual or application from an application market or an application store in order to properly use the Bluetooth device. The application market or application store is typically operated by a mobile communications company or a mobile terminal manufacturer.

As described above, it is inconvenient for users to search for information regarding a Bluetooth device in person in order to correctly use the Bluetooth device. In addition, it may be difficult for some users to easily understand which application to download and use even in the case in which users have read a manual related to a Bluetooth device.

SUMMARY

Various aspects of the present disclosure provide a wearable device registration system and method for searching for wearable devices having a Bluetooth communication function in a surrounding area and being provided with detailed information regarding the searched wearable devices by a separate server.

According to an aspect, a wearable device registration system may include: a searching Bluetooth device broadcasting a session description protocol (SDP) request message for searching for surrounding Bluetooth devices by executing an SDP, when an SDP response message including access information, by which a detailed device information file is downloadable, is received in response to the broadcast SDP request message, requesting that a server provide the detailed device information file regarding a corresponding surrounding Bluetooth device, based on the access information, and when the detailed information file regarding the corresponding surrounding Bluetooth device is received from the server, storing the detailed information file; and a search target Bluetooth device generating the SDP response message including the access information for access to the server, in response to the SDP request message transmitted by the searching Bluetooth device, and transmitting the SDP response message to the searching Bluetooth device.

The access information may be uniform resource locator (URL) information of the server. The SDP response message of the search target Bluetooth device may include at least one of information regarding a manufacturer thereof, information regarding a unique identifier thereof, and the URL information, by which detailed device information thereof is downloadable.

The URL information may be stored in a documentation URL field of the SDP.

The searching Bluetooth device may include: a Bluetooth communication module for Bluetooth communications; an Internet communication module for communications with the server; and a memory in which the SDP, by which the surrounding Bluetooth devices are searched for, and detailed information regarding the found surrounding Bluetooth devices are registered and stored.

The detailed information file may be transmitted from the server to the searching Bluetooth device, based on extensible markup language (XML) using one Internet protocol selected from hypertext transfer protocol (HTTP) and file transfer protocol (FTP). The detailed information file may include at least one information selected from among information regarding functions of the corresponding surrounding Bluetooth device, information regarding detailed operations of the functions, and information regarding the internal configuration of the corresponding surrounding Bluetooth device.

According to another aspect, a wearable device registration method may include: broadcasting, by a searching Bluetooth device, an SDP request message for searching for a surrounding Bluetooth device by executing an SDP; when the SDP request message broadcast by the searching Bluetooth device is received, executing, by the surrounding Bluetooth device, an SDP, generating an SDP response message including server access information, by which a detailed information file thereof is downloadable, and transmitting the SDP response message to the searching Bluetooth device; when the SDP response message is received, requesting, by the searching Bluetooth device, that a server provide the detailed information file of the surrounding Bluetooth device, based on the server access information included in the SDP response message; and when the detailed information file of the surrounding Bluetooth device is received from the server, storing, by the searching Bluetooth device, the detailed information file.

The access information may be URL information of the server. The SDP response message of the search target Bluetooth device may include at least one of information regarding a manufacturer thereof, information regarding a unique identifier thereof, and the URL information, by which detailed device information thereof is downloadable.

The URL information may be stored in a documentation URL field of the SDP.

The detailed information file may be transmitted from the server to the searching Bluetooth device, based on extensible markup language (XML) using one Internet protocol selected from hypertext transfer protocol (HTTP) and file transfer protocol (FTP). The detailed information file may include at least one information selected from among information regarding functions of the surrounding Bluetooth device, information regarding detailed operations of the functions, and information regarding the internal configuration of the surrounding Bluetooth device.

According to the present disclosure, the searching Bluetooth device can receive access information (URL), by which information regarding a target Bluetooth device is downloaded, from the target Bluetooth device, easily download and check detailed information regarding the corresponding Bluetooth device from a remote server, based on the received access information.

According to the present disclosure, since information regarding an internal device, included in a Bluetooth device, is provided more specifically, devices using more various Bluetooth protocols can be used by interworking between devices.

BRIEF DESCRIPTION OF THE DRAWINGS

FIG. 2 is a process flowchart illustrating a wearable device registration method according to the present disclosure.

DETAILED DESCRIPTION

Figure 1:
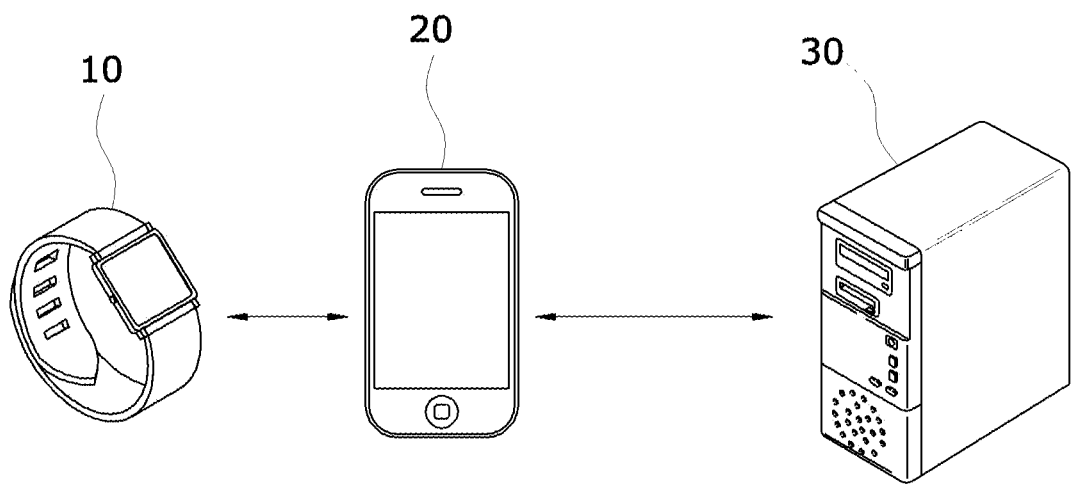
FIG. 1 illustrates a network connection configuration of a wearable device registration system according to the present disclosure.

The above and other objects, features, and advantages of the present disclosure will be more clearly understood from the following detailed description of exemplary embodiments when taken in conjunction with the accompanying drawings. The present disclosure may, however, be embodied in many different forms and should not be construed to be limited to the embodiments set forth herein. Rather, these embodiments are provided so that this disclosure will be thorough and complete, and will fully convey the scope of the invention to those skilled in the art. It should be understood that the scope of the present disclosure shall be defined by the appended Claims. Terms used herein are intended to describe embodiments but not to limit the present disclosure. Descriptions of components in the singular form used herein are intended to include descriptions of components in the plural form, unless explicitly described to the contrary. It will be understood that the terms "comprise," "include," "have," and any variations thereof used herein are intended to cover non-exclusive inclusions of components, steps, operations, and/or devices described herein, unless explicitly described to the contrary.

In the following description of the present disclosure, detailed descriptions of known functions and components incorporated herein will be omitted in the case that the subject matter of the present disclosure may be rendered unclear thereby. The terms used herein are defined in consideration of functions thereof in embodiments set forth herein, and may be varied depending on the intention of an operator or the practice. Accordingly, these terms shall be defined based on the overall contents of the specification.

Hereinafter, a wearable device registration system and method according to the present disclosure will be described in detail with reference to the accompanying drawings.

FIG. 1 illustrates a network connection configuration of the wearable device registration system according to the present disclosure.

As illustrated in FIG. 1, the wearable device registration system according to the present disclosure may include a search target Bluetooth device 10, a searching Bluetooth device 20, and a server 30 (e.g., a computing device having a processor, a memory and a communication interface).

The searching Bluetooth device 20 is a device communicating with the search target Bluetooth device 10 (i.e., a Bluetooth device in a surrounding area) via Bluetooth communication. The searching Bluetooth device 20 may be a smartphone, a personal computer (PC), a notebook computer, or the like.

The searching Bluetooth device 20 includes a Bluetooth communication module and an Internet communication module. The searching Bluetooth device 20 may further include a memory in which a session description protocol (SDP), by which the Bluetooth device in the surrounding area is searched for, and detailed information regarding the Bluetooth device found in the surrounding area are registered and stored.

In response to a user request for searching for and registering Bluetooth devices in a surrounding area, the searching Bluetooth device 20 broadcasts an SDP request message for searching for the search target Bluetooth device 10, i.e., the surrounding Bluetooth device, via the Bluetooth communication module, by executing the SDP stored in the memory.

When an SDP response message is received in response to the broadcast SDP request message, the searching Bluetooth device 20 extracts uniform resource locator (URL) information of the server 30 from the received SDP message, accesses the server 30 via the Internet communication module, based on the extracted URL, and requests a detailed information file regarding a manufacturer, device-specific information, and detailed information (regarding the function, operating method, configuration, and the like) thereof.

When the detailed information file regarding the corresponding search target Bluetooth device 10 is received from the server 30 in response to the request, the searching Bluetooth device 20 stores and registers the received detailed information file in the memory, so as to correspond to the name of the corresponding device.

The searching Bluetooth device 20 may display the detailed information and the URL information regarding the search target Bluetooth device 10, included in the received SDP response message, on a display device included therein, or may display the detailed information file of the search target Bluetooth device 10, transmitted by the server 30, on a user interface (UI), as selected by the user.

The operation of the searching Bluetooth device 20 requesting that the server 30 provide the detailed information may be performed when the manufacturer and the unique information of the displayed search target Bluetooth device 10 are selected or may be automatically performed without a user selection.

The search target Bluetooth device 10 collectively refers to one of a variety of devices having a Bluetooth communication function, such as a smartwatch, a smartband, a smartglass, a personal computer (PC), a notebook computer, or a smartphone. The search target Bluetooth device 10 may include the memory (e.g., a random access memory (RAM) or a flash memory) therein. The memory can store basic device information, such as SDP, by which Bluetooth devices in the surrounding area are searched for, information regarding a manufacturer of the search target Bluetooth device, and unique device information, as well as access information or URL information, by which a detailed information file of the search target Bluetooth device can be downloaded. The URL information may be stored in a documentation URL field of the SDP protocol.

When the SDP request message is received from the searching Bluetooth device 20, the search target Bluetooth device 10 transmits an SDP response message to the searching Bluetooth device 20 via a Bluetooth communication module (not shown) by executing an SDP search protocol. The SDP response message of the search target Bluetooth device may include information regarding the manufacturer thereof and the unique identifier (ID) or number thereof, as well as URL information, by which detailed information of the search target Bluetooth device can be downloaded.

The server 30 has device-specific detailed information files of all Bluetooth devices, previously stored in a database. The server 30 extracts a detailed information file regarding the corresponding device, based on the information regarding the manufacturer and the device unique ID of the corresponding search target Bluetooth device 10 requested by the searching Bluetooth device 20, and transmits the extracted detailed information file to the searching Bluetooth device 20. The detailed information file is transmitted from the server 30 to the searching Bluetooth device 20, based on extensible markup language (XML) using an Internet protocol, such as hypertext transfer protocol (HTTP) or file transfer protocol (FTP). The detailed information file may include information regarding functions of the corresponding device, information regarding detailed operations of the functions, information regarding the internal configuration of the corresponding device, and the like.

The detailed information file may include device/service descriptions of universal plug and play (UPnP) or a schema of oneM2M.

Hereinafter, the wearable device registration system having the above-described configuration will be described in detail.

First, in response to a user request for searching for and registering Bluetooth devices in a surrounding area, the searching Bluetooth device 20 broadcasts an SDP request message for searching for the search target Bluetooth device 10, i.e., the surrounding Bluetooth device, via the Bluetooth communication module, by executing an SDP stored in the memory.

When the SDP request message broadcast by the searching Bluetooth device 20 is received, the search target Bluetooth device 10 executes an SDP search protocol, and according to the SDP search protocol, transmits an SDP response message to the searching Bluetooth device 20 via a Bluetooth communication module. The SDP response message of the search target Bluetooth device may include information regarding the manufacturer thereof and the unique ID or number thereof, as well as URL information, by which detailed information of the search target Bluetooth device can be downloaded.

When an SDP response message is received in response to the broadcast SDP request message, the searching Bluetooth device 20 extracts the information regarding the manufacturer and the unique ID or number of the search target Bluetooth device, as well as the URL information, by which detailed information (i.e., detailed information regarding functions, operations, the configuration, and the like) of the search target Bluetooth device can be downloaded, from the received SDP message. Subsequently, the searching Bluetooth device 20 accesses the server 30 via the Internet communication module, based on the extracted URL, and requests that the server 30 provide a detailed information file regarding the manufacturer and the unique information of the search target Bluetooth device 10.

The server 30 extracts the detailed information file of the search target Bluetooth device 10 from the database, based on the information regarding the manufacturer and the unique ID of the search target Bluetooth device 10 requested by the searching Bluetooth device 20, and transmits the extracted detailed information file to the searching Bluetooth device 20. The server 30 may transmit the detailed information file to the searching Bluetooth device 20 based on XML using an Internet protocol, such as HTTP or FTP). The detailed information file may include information regarding functions of the corresponding device, information regarding detailed operations of the functions, information regarding the internal configuration of the corresponding device, and the like.

When the detailed information file regarding the corresponding device, i.e., the search target Bluetooth device 10, is received from the server 30, the searching Bluetooth device 20 stores the received detailed information file in the memory, so as to correspond to the corresponding device, and displays the received detailed information file of the corresponding device on the display device.

After the detailed information file is displayed as described above, in response to a user selection, the searching Bluetooth device 20 may display the corresponding detailed information on the display device so as to be checked by the user.

Hereinafter, a wearable device registration method according to the present disclosure, corresponding to the above-described wearable device registration system according to the present disclosure, will be described step by step with reference to a flowchart illustrated in FIG. 2.

FIG. 2 is a process flowchart illustrating the wearable device registration method according to the present disclosure.

As illustrated in FIG. 2, in S201, it is determined whether or not there is a user request for searching for and registering Bluetooth devices in a surrounding area.

When it is determined that there is a user request for searching for and registering Bluetooth devices in a surrounding area, in S202, the searching Bluetooth device 20 broadcasts an SDP request message for searching for Bluetooth devices in the surrounding area by executing an SDP designed for searching for surrounding Bluetooth devices.

When the SDP request message broadcast by the searching Bluetooth device 20 is received, in S203, each of the surrounding Bluetooth devices, i.e., search target Bluetooth devices, executes an SDP search protocol stored in memories thereof, and according to the SDP search protocol, transmits an SDP response message to the searching Bluetooth device 20 via a Bluetooth communication module. The SDP response message of the search target Bluetooth device 20 may include information regarding the manufacturer thereof and the unique ID or number thereof, as well as URL information, by which detailed information of the search target Bluetooth device can be downloaded. The URL information may be stored in a documentation URL field of the SDP.

Subsequently, when the SDP response message is received from each of the surrounding search target Bluetooth devices, in S204, the searching Bluetooth device extracts the information regarding the manufacturer and the unique ID or number of the search target Bluetooth device 10, as well as the URL information, by which detailed information (i.e., detailed information regarding functions, operations, the configuration, and the like) of the search target Bluetooth device 10 can be downloaded, from the received SDP message. Subsequently, the searching Bluetooth device 20 accesses the server 30 via the Internet communication module, based on the extracted URL, and requests that the server 30 provide a detailed information file regarding the manufacturer and the unique information of the search target Bluetooth device 10.

In S205, in response to the request from the searching Bluetooth device 20, the server 30 extracts the detailed information file of the search target Bluetooth device 10 from the database, based on the information regarding the manufacturer and the unique ID of the search target Bluetooth device 10 requested by the searching Bluetooth device 20, and transmits the extracted detailed information file to the searching Bluetooth device 20. The server 30 may transmit the detailed information file to the searching Bluetooth device 20 based on XML, using an Internet protocol, such as HTTP or FTP). The detailed information file may include information regarding functions of the corresponding device, information regarding detailed operations of the functions, information regarding the internal configuration of the corresponding device, and the like.

Subsequently, when the detailed information files regarding the corresponding devices, i.e., the search target Bluetooth devices, are received from the server 30, in S206, the searching Bluetooth device 20 stores the received detailed information files in the memory, so as to correspond to the corresponding device, and displays the received detailed information file of the corresponding device on the display device.

After the detailed information file is displayed as described above, in response to a user selection, the searching Bluetooth device 20 may display the corresponding detailed information on the display device so as to be checked by the user.

Although the wearable device registration system and method according to the present disclosure have been described with reference to the exemplary embodiments, the scope of the present disclosure should not be construed as being limited to these specific embodiments. A person skilled in the art to which the present disclosure relates could make a variety of alternatives, modifications, and alterations without departing from the scope of the present disclosure.

Therefore, the foregoing embodiments disclosed herein and the accompanying drawings shall be interpreted as illustrative, while not being limitative, of the principle and scope of the present disclosure. It should be understood that the scope of the present disclosure shall be defined by the appended Claims and all of their equivalents fall within the scope of the present disclosure.

What is claimed is:

1. A wearable device registration system comprising:
a first Bluetooth device comprising a memory, a display, a Bluetooth communication module and an Internet communication module separate from the Bluetooth communication module, wherein the first Bluetooth device is configured to: broadcast, via the Bluetooth communication module, a session description protocol (SDP) request message for discovering one or more other Bluetooth devices located near the first Bluetooth device, receive, via the Bluetooth communication module and in response to the SDP request message, an SDP response message from a second Bluetooth device, wherein the SDP response message includes access information for downloading a device information file containing information relating to the second Bluetooth device transmit, via the Internet communication module and using the access information of the SDP response message received via the Bluetooth communication module, a request for the device information file to a server in data communication with the first Bluetooth device, download, via the Internet communication module, the device information file from the server, store the received device information file so as to identify the second Bluetooth device, receive the device information file from the server based on extensible markup language (XML) using one Internet protocol selected from hypertext transfer protocol (HTTP) and file transfer protocol (FTP), the device information file comprising at least one information selected from among information regarding functions of the second Bluetooth device, information regarding operations of the functions, and information regarding the internal configuration of the second Bluetooth device, and display at least part of information contained in the device information file.

2. The system according to claim 1, wherein the access information includes a uniform resource locator (URL) of the server.

3. The system according to claim 1, wherein the SDP response message received from the second Bluetooth device includes at least one of information regarding a manufacturer thereof, information regarding a unique identifier thereof, and a uniform resource locator (URL) for downloading the device information file.

4. The system according to claim 3, wherein the URL is stored in a documentation URL field of the SDP response message.

5. A method for wearable device registration, the method comprising: broadcasting, using a Bluetooth communication module of a first Bluetooth device, a session description protocol (SOP) request message for discovering one or more other Bluetooth devices located near the first Bluetooth device; receiving, via the Bluetooth communication module and in response to the SDP request message, an SDP response message from a second Bluetooth device, wherein the SDP response message includes access information for downloading a device information file containing information relating to the second Bluetooth device; transmitting, via an Internet communication module of the first Bluetooth device and using the access information of the SDP response message, a request for the device information file to a server in data communication with the first Bluetooth device; downloading, via the Internet communication module, the device information file from the server; storing, in a memory of the first Bluetooth device, the received device information file so as to identify the second Bluetooth device; wherein the device information file is transmitted from the server to the first Bluetooth device, based on extensible markup language (XML) using one Internet protocol selected from hypertext transfer protocol (HTTP) and file transfer protocol (FTP), the device information file comprising at least one information selected from among information regarding functions of the second Bluetooth device, information regarding operations of the functions, and information regarding the internal configuration of the second Bluetooth device; and displaying at least part of the information contained in the device information file.

6. The method according to claim 5, wherein the access information includes a uniform resource locator (URL) of the server.

7. The method according to claim 5, wherein the SDP response message received from the second Bluetooth device includes at least one of information regarding a manufacturer thereof, information regarding a unique identifier thereof, and a uniform resource locator (URL) for downloading the device information file.

8. The method according to claim 5, wherein the URL is stored in a documentation URL field of the SDP response message.

* * * * *